(12) United States Patent
Moreno et al.

(10) Patent No.: US 8,848,508 B2
(45) Date of Patent: Sep. 30, 2014

(54) METHOD FOR THE PROVISION OF GATEWAY ANYCAST VIRTUAL MAC REACHABILITY IN EXTENDED SUBNETS

(75) Inventors: Victor M. Moreno, Carlsbad, CA (US); Robert Starmer, San Jose, CA (US); Sanjay Sane, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 887 days.

(21) Appl. No.: 12/619,425

(22) Filed: Nov. 16, 2009

(65) Prior Publication Data

US 2011/0116509 A1 May 19, 2011

(51) Int. Cl.
*G06F 11/00* (2006.01)
*H04L 12/931* (2013.01)
*H04L 12/46* (2006.01)
*H04L 12/703* (2013.01)
*H04L 12/721* (2013.01)

(52) U.S. Cl.
CPC .......... *H04L 12/4625* (2013.01); *H04L 49/351* (2013.01); *H04L 45/28* (2013.01); *H04L 45/66* (2013.01)
USPC ........... 370/216; 370/217; 370/219; 370/220; 370/392

(58) Field of Classification Search
None
See application file for complete search history.

(56) References Cited

U.S. PATENT DOCUMENTS

| | | | | |
|---|---|---|---|---|
| 6,101,188 | A * | 8/2000 | Sekine et al. ................. | 370/401 |
| 6,172,981 | B1 * | 1/2001 | Cox et al. ...................... | 370/401 |
| 6,804,233 | B1 * | 10/2004 | Congdon et al. .............. | 370/389 |
| 6,931,452 | B1 * | 8/2005 | Lamberton et al. ........... | 709/242 |
| 7,152,179 | B1 * | 12/2006 | Critchfield ................... | 714/4.11 |
| 7,486,611 | B1 * | 2/2009 | Wilson .......................... | 370/220 |
| 7,580,417 | B2 * | 8/2009 | Ervin et al. ................... | 370/397 |
| 7,603,480 | B2 * | 10/2009 | Imai et al. ..................... | 709/239 |
| 8,259,720 | B2 * | 9/2012 | Farinacci et al. ............. | 370/392 |
| 2002/0018489 | A1 * | 2/2002 | Ambe et al. ................... | 370/475 |
| 2004/0003285 | A1 * | 1/2004 | Whelan et al. ................ | 713/201 |
| 2005/0066072 | A1 * | 3/2005 | Nakamura ....................... | 710/8 |
| 2005/0141537 | A1 * | 6/2005 | Kumar et al. ................. | 370/429 |
| 2006/0200584 | A1 * | 9/2006 | Bhat ............................. | 709/249 |
| 2006/0215594 | A1 | 9/2006 | Shirokura et al. | |
| 2006/0248191 | A1 * | 11/2006 | Hudson et al. ................ | 709/226 |
| 2006/0251075 | A1 * | 11/2006 | Tams et al. .................... | 370/392 |
| 2007/0147261 | A1 * | 6/2007 | Schumacher et al. ........ | 370/248 |

(Continued)

OTHER PUBLICATIONS

Hewlett-Packard, "ProCurve Series 8200zl Switches—Advanced Traffic Management Guide", Sep. 2007, pp. 2-18-2-22.*

(Continued)

*Primary Examiner* — Faruk Hamza
*Assistant Examiner* — Andrew Oh
(74) *Attorney, Agent, or Firm* — Patterson + Sheridan, LLP (57) ABSTRACT

A method and apparatus is disclosed for providing gateway anycast virtual MAC reachability in extended subnets. When an extended L2 subnet spans more than one geographical location, it is desirable that the gateway MAC addresses learned in each location be the same across all IP hosts. Accordingly, the gateway MAC address may be preserved (i.e., programmed) in more than one port on a bridge, such as both a local port and a LAN extension port. The bridge may forward traffic having the anycast MAC address to the closest instance of the MAC address, rather than replicating the traffic to the multiple ports on which the anycast MAC address is programmed. If the gateway reachable on the local port goes down, the frame may be forwarded to the local gateway in the second layer 2 subnet over the LAN extension port.

16 Claims, 7 Drawing Sheets

(56) References Cited

U.S. PATENT DOCUMENTS

| | | | |
|---|---|---|---|
| 2007/0189168 A1* | 8/2007 | Yao | 370/231 |
| 2007/0258462 A1* | 11/2007 | Veits | 370/395.31 |
| 2008/0005343 A1* | 1/2008 | Bauman et al. | 709/230 |
| 2008/0031263 A1* | 2/2008 | Ervin et al. | 370/397 |
| 2008/0034112 A1* | 2/2008 | Imai et al. | 709/238 |
| 2008/0046597 A1* | 2/2008 | Stademann et al. | 709/249 |
| 2008/0071893 A1* | 3/2008 | Ohhira | 709/222 |
| 2008/0072285 A1* | 3/2008 | Sankaran et al. | 726/2 |
| 2008/0080535 A1* | 4/2008 | Li et al. | 370/401 |
| 2008/0109864 A1* | 5/2008 | Danforth et al. | 725/111 |
| 2008/0126540 A1* | 5/2008 | Zeng et al. | 709/225 |
| 2008/0144620 A1* | 6/2008 | Jain et al. | 370/389 |
| 2008/0186968 A1* | 8/2008 | Farinacci et al. | 370/392 |
| 2008/0288614 A1* | 11/2008 | Gil et al. | 709/220 |
| 2009/0222920 A1* | 9/2009 | Chow et al. | 726/23 |
| 2009/0287955 A1* | 11/2009 | Matsumoto et al. | 714/4 |
| 2009/0316704 A1* | 12/2009 | Sodder et al. | 370/395.6 |
| 2010/0011139 A1* | 1/2010 | Wang et al. | 710/110 |
| 2010/0083356 A1* | 4/2010 | Steckley et al. | 726/5 |
| 2010/0189117 A1* | 7/2010 | Gowda et al. | 370/401 |
| 2010/0274924 A1* | 10/2010 | Allan et al. | 709/245 |
| 2011/0030032 A1* | 2/2011 | Baykal et al. | 726/3 |
| 2012/0014383 A1* | 1/2012 | Geromel et al. | 370/352 |

OTHER PUBLICATIONS

Hewlett-Packard: "ProCurve Series 8200zl Switches—Advanced Traffic Management Guide," Sep. 2007 pp. 2-18-2-22.

Pflueger, Gerd, "Data Center Interconnect mit Layer 2—Solutions Overview," Sep. 17, 2009, pp. 1-46.

Partial International Search Report for International Application No. PCT/US2010/056834 dated Mar. 14, 2011.

International Search Report for International Application No. PCT/US2010/056834 dated May 20, 2011.

\* cited by examiner

METHOD FOR THE PROVISION OF GATEWAY ANYCAST VIRTUAL MAC REACHABILITY IN EXTENDED SUBNETS

TECHNICAL FIELD

Embodiments described in this disclosure generally relate to extended subnets. More particularly, the described embodiments relate to methods and apparatus for providing gateway anycast virtual MAC reachability in extended subnets.

BACKGROUND

Modern data center deployments frequently extend layer 2 subnets across multiple sites. This creates a large layer 2 (L2) domain that spans multiple sites. The extended subnets are reachable from the internet protocol (IP) network and have a default gateway. There may be many potential default gateways present on the subnet.

Since the host stack points to one default gateway IP address, a First Hop Resiliency Protocol (FHRP) is used to distribute the load of egress traffic over the different available physical gateways while allowing the different physical gateways to share a common logical IP address. The FHRPs normally rely on the manipulation of address resolution protocol (ARP) responses to the hosts in order to balance the load across different gateways that would have different media access control (MAC) addresses yet the same IP address. An ARP is a network layer protocol used to convert an IP address into a physical address, such as an Ethernet address. When the Layer 2 domain in which the FHRP exists is geographically distributed, the egress physical gateway can be selected to avoid traversing the LAN extension unnecessarily.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Embodiments of the present disclosure provide techniques to identify that a gateway media access control (MAC) address is programmed in more than one port and resolve the illegal condition (a given MAC address can only be programmed on a single port at any given time) based on the awareness of the existence of an L2 extension (i.e., a layer 2 domain distributed over multiple subnets). One embodiment disclosed herein provides a method for providing anycast MAC reachability in extended subnets. The method may generally include identifying, in an extended subnet, a gateway MAC address that is reachable over both a LAN extension port and a local port. The extended subnet itself may include a first layer 2 subnet and a second layer 2 subnet connected through a respective bridge on the first layer 2 subnet and the second layer 2 subnet. Further each layer 2 subnet may provide at least one local gateway connecting the respective layer 2 subnet to an IP network. The method may further include preserving the identified gateway MAC address by programming the identified gateway MAC address on both the local port and the LAN extension port.

A bridge may forward traffic having the anycast MAC address to the closest instance of the MAC address, rather than replicating the traffic to the multiple ports on which the anycast MAC address is programmed. If the gateway reachable on the local port goes down, the frame may be forwarded to the local gateway in the second layer 2 subnet over the LAN extension port.

DETAILED DESCRIPTION OF EXAMPLE EMBODIMENTS

Modern data center deployments frequently extend layer 2 (L2) subnets across multiple sites. This creates a large L2 domain that spans more than one geographical location. In an extended layer 2 subnet, it is desirable that the gateway MAC addresses learned in each location be the same across all IP hosts. However, each layer 2 subnet may have a distinct physical gateway, leading to the gateway MAC addresses being used on multiple ports. This results in a scenario in which a MAC address is used multiple times. That is, the MAC address may be present in more than one bridge port (e.g., the local bridge port and the LAN extension port). Presence of a MAC address in more than one port is normally illegal, and only the last MAC address learned is preserved. Since traffic is generated from different sources, the MAC address may switch between different ports, e.g., each time a packet having the MAC gateway address traverses one of the ports on the bridge.

The present disclosure provides a method to identify the MAC addresses programmed in more than one port and resolve the illegal condition based on the awareness of the existence of an L2 extension (i.e., a layer 2 domain distributed over multiple subnets). Doing so can achieve a networking environment in which virtual MAC addresses representing the IP gateway for a subnet are reachable by proximity. That is, gateways in multiple L2 subnets are made available to hosts using an anycast MAC reachability technique. Anycast is a network addressing and routing scheme where data packets or frames are routed to one of multiple, available destinations. Typically, a destination is selected which improves routing efficiency or throughput or reduces network latency. Embodiments described herein provide improved egress gateway selection, as well as an inherent failover response (e.g., if the gateway in one L2 subnet fails, traffic may be forwarded to a gateway in another subnet). To hosts, such a failover can be transparent, as the MAC addresses for the gateway in each subnet are the same.

This disclosure references various embodiments. However, it should be understood that this disclosure is not limited to embodiments described herein. Instead, any combination of the following features and elements, whether related to different embodiments or not, is contemplated to implement and practice an embodiment. Furthermore, in various embodiments, embodiments provide numerous advantages over the prior art. However, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim Additionally, application programs disclosed herein may be distributed on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. For example, as described in greater detail herein, one embodiment includes a computer-readable storage medium containing a program, which when executed on a processor is configured to perform an operation for providing anycast virtual media access control (MAC) reachability in extended subnets.

Figure 1:
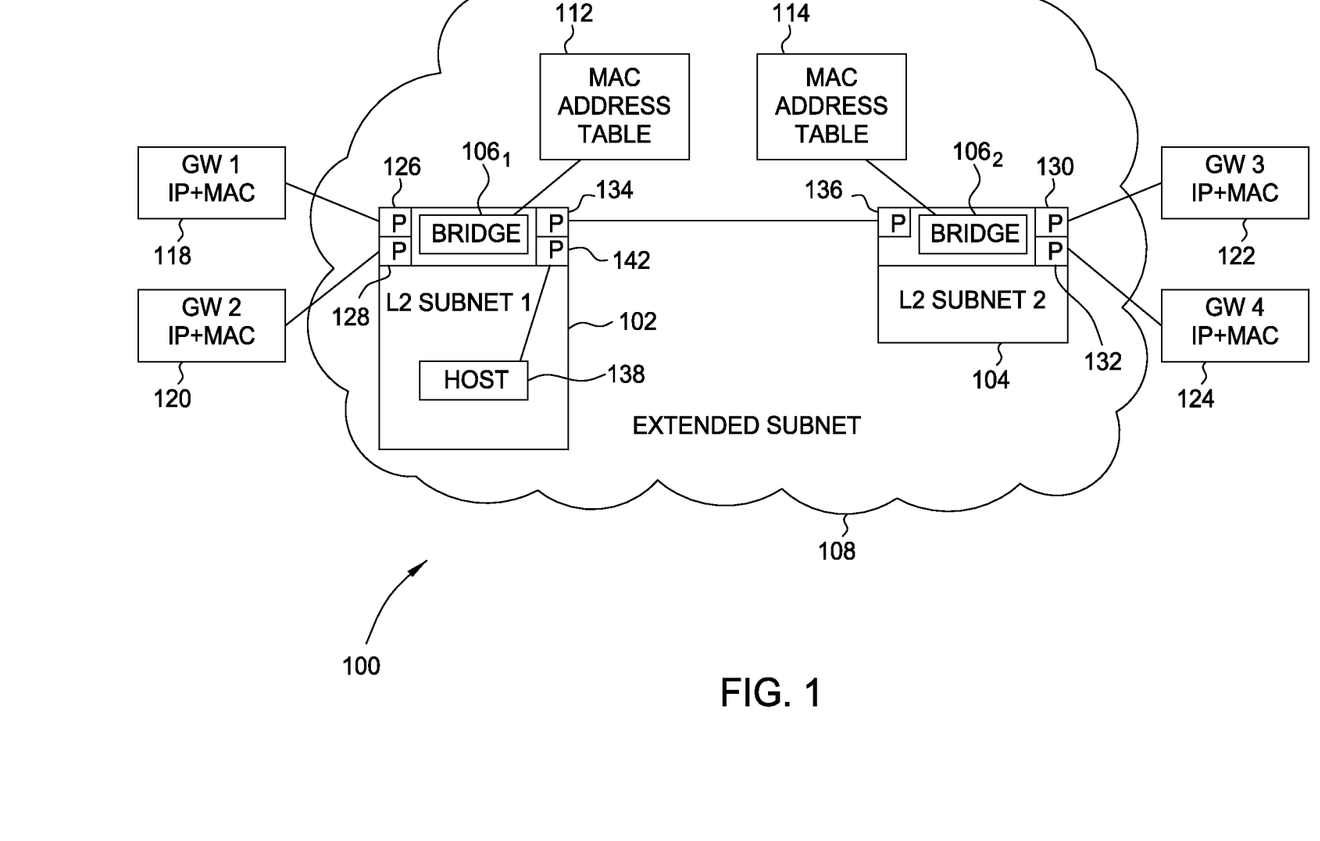
FIG. 1 is a block diagram illustrating an example network topology that includes layer 2 subnets that are connected through a bridge, according to one embodiment.

FIG. 1 is a block diagram illustrating an example network topology 100, according to one embodiment. As shown, the network topology 100 includes a first layer 2 (L2) subnet 102 and a second layer 2 (L2) subnet 104, connected through bridges $106_1$ and $106_2$. Illustratively, bridge $106_1$ includes local ports 126, 128, 132 and 142. Local ports connect hosts in a given subnet (e.g., L2 subnet 102) to a local bridge domain (i.e., local ports connect the hosts in one subnet to that subnet). For example, FIG. 1 shows a host 138 connected to one of the ports on the bridge $106_1$ (specifically, port 142). Each host in the subnet provides a computing device capable of joining the local subnet and sending/receiving network frames. Thus, the first L2 subnet 102 and the second L2 subnet 104 may each include a variety of host devices connected to the bridge $106_1$ and $106_2$.

As shown, LAN extension port 134 connects the bridge $106_1$ in the L2 subnet 102 to the bridge $106_2$ in the L2 subnet 104. This results in an extended subnet 108. Bridge $106_2$ includes a LAN extension port 136, as well as local ports 130 and 132. LAN extension ports 134, 136 provide connectivity between subnets and can be either physical or logical depending on the technology used for LAN extension. For certain embodiments, the LAN extension interface may be a virtual private LAN service (VPLS) connected interface, an Overlay Transport Virtualization (OTV) overlay interface, or a Virtual Port Channel/Virtual Switching System (vPC/VSS) interface interconnecting remote sites. It should be noted that this list is not exhaustive and in general any type of interface providing LAN extensions beyond an L2/L3 boundary could be utilized with the proposed method.

Ports 126 and 128 connect gateway 1 118 and gateway 2 120 to the first L2 subnet 102. The gateways 118 and 120 each allow the hosts in the first L2 subnet 102 to communicate with other networks. Similarly, gateways 122, 124 (connected to ports 130 and 132 on bridge $106_2$, respectively) allow hosts in the second L2 subnet 104 to communicate with other networks.

When the bridge $106_1$ receives a network frame from one of the hosts (e.g., host 138 or the gateway 118), the bridge $106_1$ learns a source address (e.g., an Ethernet MAC address) for the port on the bridging device on which the network frame is received. In response, the bridge $106_1$ may program that learned address as being on the port over which the bridge $106_1$ receives the frame. Subsequently, when the bridge $106_1$ receives a network frame with a destination address that has been learned for one of the ports, the bridge $106_1$ forwards the frame over that port (as opposed to broadcasting the frame over all ports). For example, the bridge $106_1$ may learn that the MAC address belonging to host 138 is attached to port 142 and that the MAC address belonging to local gateway 118 is attached to port 126 on the bridge $106_1$. Similarly, bridge $106_2$ may learn the MAC address of gateway 122 and gateway 124 may on local ports 130, 132.

When bridge $106_1$ receives a frame from a host in the second L2 subnet 104 addressed to a host in the first layer 2 subnet (e.g., a frame addressed to host 138), the bridge $106_1$ learns that the MAC address of the host in the second L2 subnet 104 is reachable over the LAN extension port 134. Note, this results in multiple addresses being learned for the LAN extension port 134. Thus, e.g., if a data frame is sent from gateway 3 122 to host 138, such a frame is forwarded to bridge $106_2$, which forwards it to bridge $106_1$ over the LAN extension port 136. Once received, bridge $106_1$ forwards the frame over port 142 to host 138. At the same time, bridge $106_1$ learns the MAC address for gateway 3 is reachable over the LAN extension port 134.

In some cases, however, users may desire to use a common MAC address for multiple gateway devices, e.g., the same MAC address for both gateway 1 118 and gateway 3 122. If the gateway MAC address on local gateway 118 is the same as the MAC address present on the gateway 122, then the bridge $106_1$ learns this MAC address on the LAN extension port 134 of bridge $106_1$. Normally, when a MAC address is learned on a port different from the original port (in this example, the LAN extension port 134), a state switch occurs. That is, the MAC address is removed from the original port (e.g., local port 126) and programmed on the LAN extension port (e.g., the LAN extension port 134). The reverse process occurs when the local gateway (e.g., gateway 118) subsequently issues a packet sourced from the other MAC address.

For certain embodiments, if a MAC address for the local gateway 118 is learned on the LAN extension port 134, the learned state is preserved on both the local port 126 and the LAN extension port 134, avoiding the state switch. The MAC addresses are stored in tables 112, 114 that keep track of the MAC assignments to different ports.

In one embodiment, the bridge $106_1$ makes an intelligent decision regarding where to send traffic with an L2 destination MAC of the anycast MAC address. For example, if a port on the bridge $106_1$ having the virtual gateway MAC address is available on the local subnet, traffic originating from the L2 subnet 102 destined to that MAC address is forwarded to the gateway on the L2 subnet (i.e., to the gateway 118 (or 120)). Further, traffic addressed to the gateway MAC address need not be replicated to the LAN extension port (i.e., the traffic need not be broadcast to the L2 subnet 104). Thus, traffic destined to the gateway MAC is preferentially serviced by the local gateway (e.g., gateway 118). If the local gateway 118 is unavailable, the traffic may be sent on the LAN extension port 134.

In one embodiment, a synchronization mechanism is used to provide all the members of the MAC addresses that are programmed on multiple ports in the extended subnet 108. That is, the MAC addresses which are subject to special treatment may be identified and shared across each bridge device connecting multiple subnets. For example, Cisco Fabric Services (CFS) may be used to synchronize members in a hot-standby router protocol (HSRP) group. When ports are brought up as LAN extension ports, CFS adjacencies are established over the LAN extension ports. The primary HSRP device may advertise the Gateway MAC addresses used in multiple ports in the extended subnet, where the advertisement is over CFS to the rest of the members. The primary HSRP device may be elected by regular HSRP mechanisms. Of course, other approaches may be used to synchronize the anycast MAC addresses shared by gateways on both the local and extension ports. For example, another approach is to use a multicast MAC address for CFS that is not link constrained (i.e., not a Bridge Protocol Data Unit (BPDU) class MAC address). Yet another approach could be to manually configure the list of MAC addresses that will be shared by gateways on both the local and the LAN extension ports.

Figure 2:
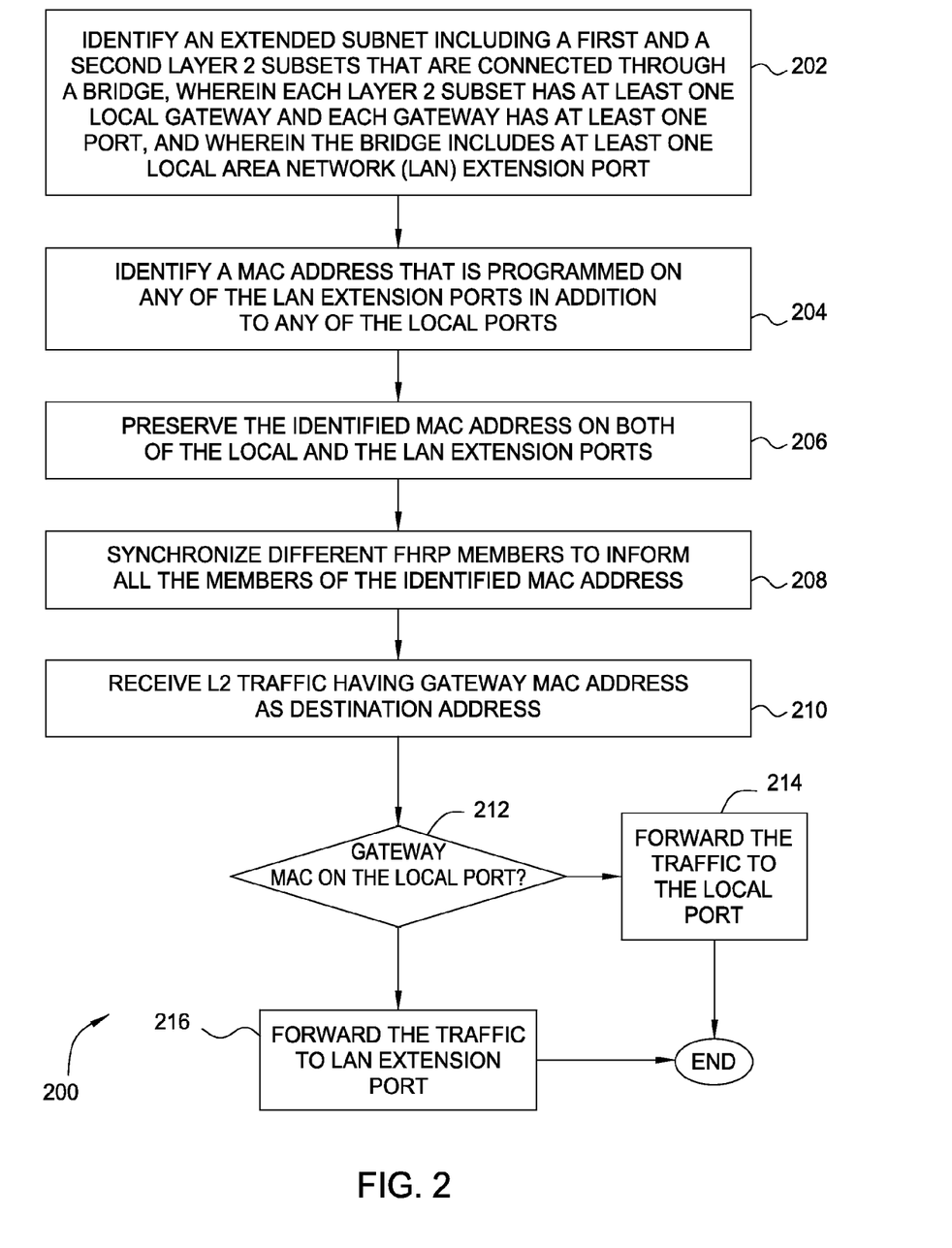
FIG. 2 is a flow chart illustrating a method for providing anycast virtual MAC reachability in extended subnets, according to one embodiment.

FIG. 2 is a flow chart illustrating a method 200 for providing anycast virtual MAC reachability in extended subnets, according to one embodiment. In the example method, an extended subnet is identified that includes a first and a second L2 subnets connected through a bridge to generate an extended subnet 202. In this example, assume that the first L2 subnet and the second L2 subnet each have at least one local gateway that uses the same MAC address (i.e., a virtual anycast MAC address).

A MAC address belonging to a local gateway is then identified as being reachable over the LAN extension port 204. The identified MAC address is preserved on both the local and the LAN extension ports 206. FHRP members are synchronized to be informed about the identified MAC addresses 208.

Network traffic is received by a L2 device (e.g., a bridge) having a gateway MAC address as the destination address 210. For example, the bridge may receive an Ethernet frame with the virtual anycast MAC address listed as the destination. At 212, if the gateway MAC address is programmed on a local port (i.e., if there is a gateway in the local subnet from which the traffic originated), then the network traffic is forwarded over the local port 214. Further, as noted above, the network traffic is not replicated to the LAN extension port (i.e., the traffic is not forwarded to other subnets in an extended L2 domain). However, if there is not a gateway MAC address programmed for the local port, then the traffic may be forwarded to the LAN extension port 216 (i.e., the traffic is sent to a different L2 subnet than the one which the traffic originated). As the gateways share the virtual anycast MAC address, the traffic can find a gateway in the remote subnet without any modifications. Thus, in addition to preferentially forwarding traffic originating in a local subnet towards a local gateway in that subnet, embodiments described herein provide additional redundancy for gateway reachability in an extended L2 subnet when an IP gateway becomes unavailable.

Figure 3A:
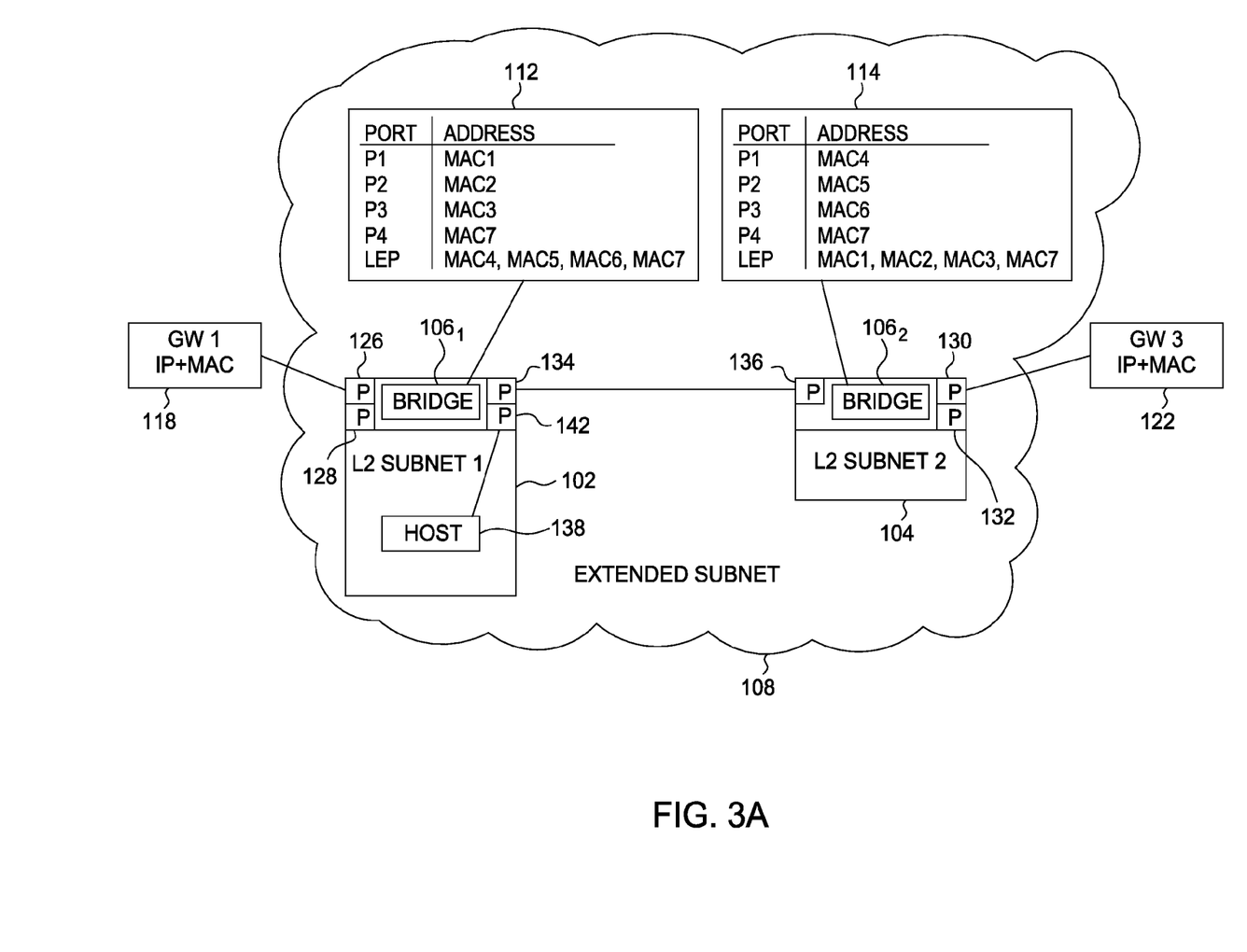
FIGS. 3A-3E illustrate an example of providing anycast virtual MAC reachability in extended subnets using the network topology illustrated in FIG. 1, according to one embodiment.

FIGS. 3A-3E illustrate an example of providing anycast virtual MAC reachability in extended subnets using the network topology first illustrated in FIG. 1, according to one embodiment. As illustrated in FIG. 3A, the MAC addresses MAC1, MAC2, MAC3 and MAC7 are programmed on local ports P1 through P4 on the first L2 subnet 102. And MAC addresses MAC4, MAC5, MAC6 and MAC7 are programmed on local ports on the second L2 subnet 104. The learned MAC addresses are stored in tables 112 and 114 on the first and the second L2 subnets, respectively. In addition, table 112 (which bridge $106_1$ uses to track port mappings on the first subnet) includes a list of the MAC addresses reachable over the LAN extension port (LEP) 134 of the bridge $106_1$. In particular, bridge $106_1$ has programmed the MAC addresses of MAC4, MAC5, MAC6 and MAC7 as being reachable over the LAN extension port 134 of bridge $106_1$. Similarly, the table 114, stores a list of the MAC addresses programmed by bridge 1062 as being reachable over the LAN extension port (LEP) 136 (specifically, MAC1, MAC2, MAC3, and MAC7).

Note, in this example, assume bridge $106_1$ and $106_2$ are configured to recognize the MAC address of "MAC7" as a virtual anycast MAC address used by multiple gateways in extended subnet 108. In this example, the MAC address of MAC7 is used by gateway 1 118 of the first L2 subnet 102 as well as gateway 3 122 of the second L2 subnet. Thus, bridge $106_1$ learns that the address of MAC7 is reachable over port "P4" in the first L2 subnet 102 (i.e., port 126). Similarly, bridge $106_2$ learns that the address of MAC7 is reachable over port "P4" in the second L2 subnet 104 (i.e., port 130). In response, bridge $106_1$ programs the MAC7 address on the local port facing gateway 1 118 and bridge $106_2$ programs the MAC7 address on the local port facing gateway 3 122. At the same time, when bridge $106_1$ receives a frame over the LAN extension port 134, it may learn that the MAC address "MAC7" is also reachable over the LAN extension port 134. This may also occur for bridge $106_2$ when it receives a frame with a source MAC address from gateway 1 118 destined for a host inside the second L2 subnet 104. As noted above, in one embodiment, the bridge $106_1$ allow the virtual anycast MAC address of MAC7 to remain programmed on both a local port (i.e., on port 126) and the LAN extension port (i.e., port 134).

Figure 3B:
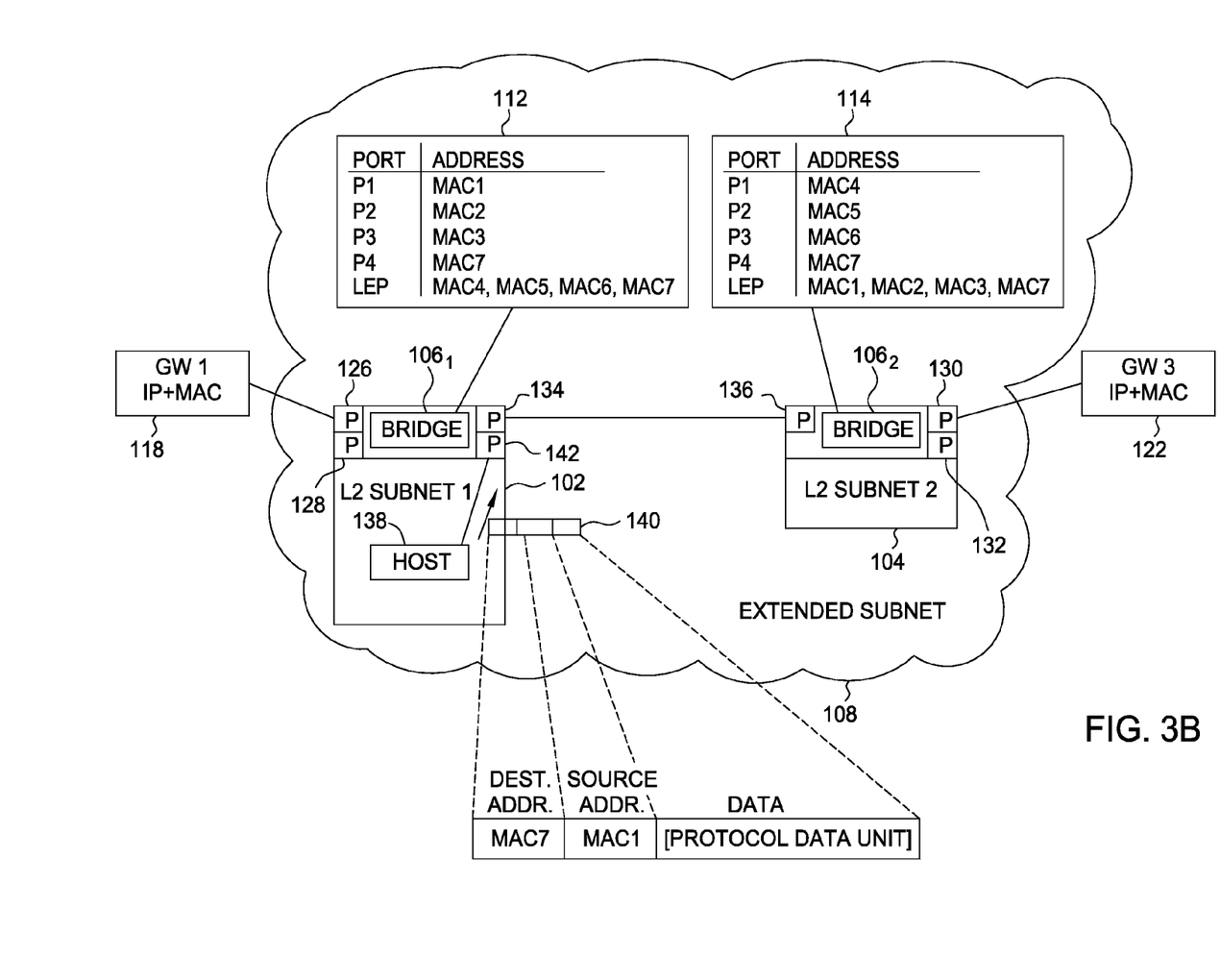

Further, in one embodiment, bridge $106_1$ (and $106_2$) make intelligent decisions regarding where to send traffic with an L2 destination address of MAC7, i.e., a destination of the anycast MAC address. For example, FIG. 3B illustrates a frame 140 with a destination address MAC7, a source address of MAC1, and a protocol data unit (PDU). Host 148 forwards the frame 140 towards the bridge $106_1$. Once received, the bridge $106_1$ identifies the destination address in the frame 140; namely, MAC7. The bridge $106_1$ determines (from MAC address table 112) that that the destination MAC address (i.e., MAC7) is an anycast MAC address reachable over both a local port (i.e., port 126) and the LAN extension port (i.e., port 134). Therefore, the bridge $106_1$ may decide which port to forward frame 140.

Figure 3C:
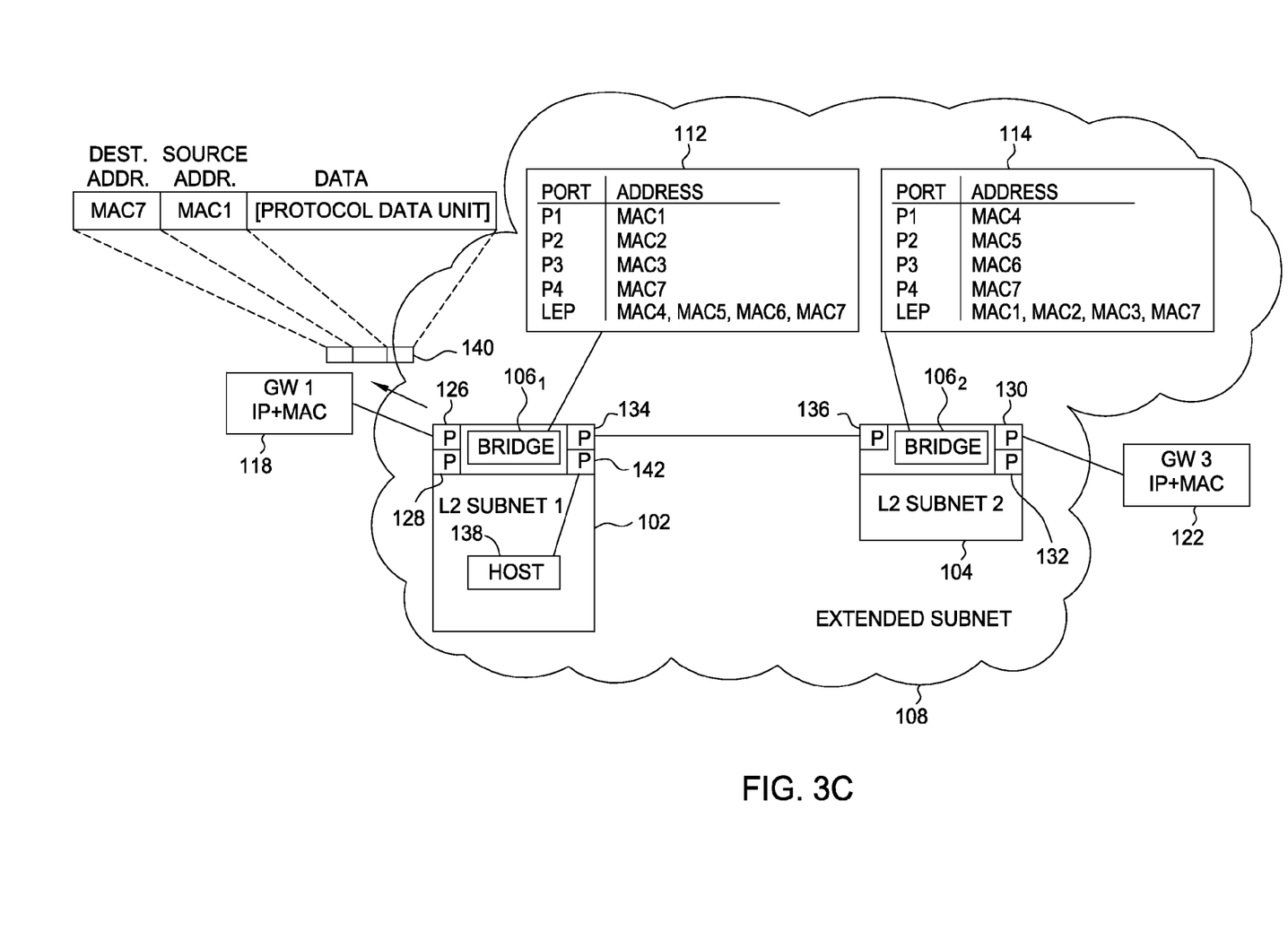

In one embodiment, bridge $106_1$, may be configured to selectively forward the frame 140 to the gateway on the local port rather than the LAN extension port. FIG. 3C illustrates this result. Specifically, FIG. 3C shows frame 140 being forwarded to the local port 126, i.e., to the gateway 1 118. In one embodiment, when bridge $106_1$ forwards frame 140 towards the gateway in the local subnet (gateway 1 118 in this example), the frame 140 is not replicated to the LAN extension port 134.

However, gateway 1 118 could go down for a variety of reasons (or simply be disconnected from subnet 102), resulting in the anycast MAC address MAC7 becoming unreachable over port 126. In such a case, bridge $106_1$ may selectively forward the frame 140 towards the gateway reachable over the LAN extension port, e.g., gateway 3 122 reachable from bridge $106_1$ over LAN extension port 134. As gateway 3 122 shares the anycast MAC address, the selective forwarding of traffic by bridge $106_1$ is transparent to hosts in the first L2 subnet 102 sending and receiving traffic to/from the MAC7 MAC address.

Figure 3D:
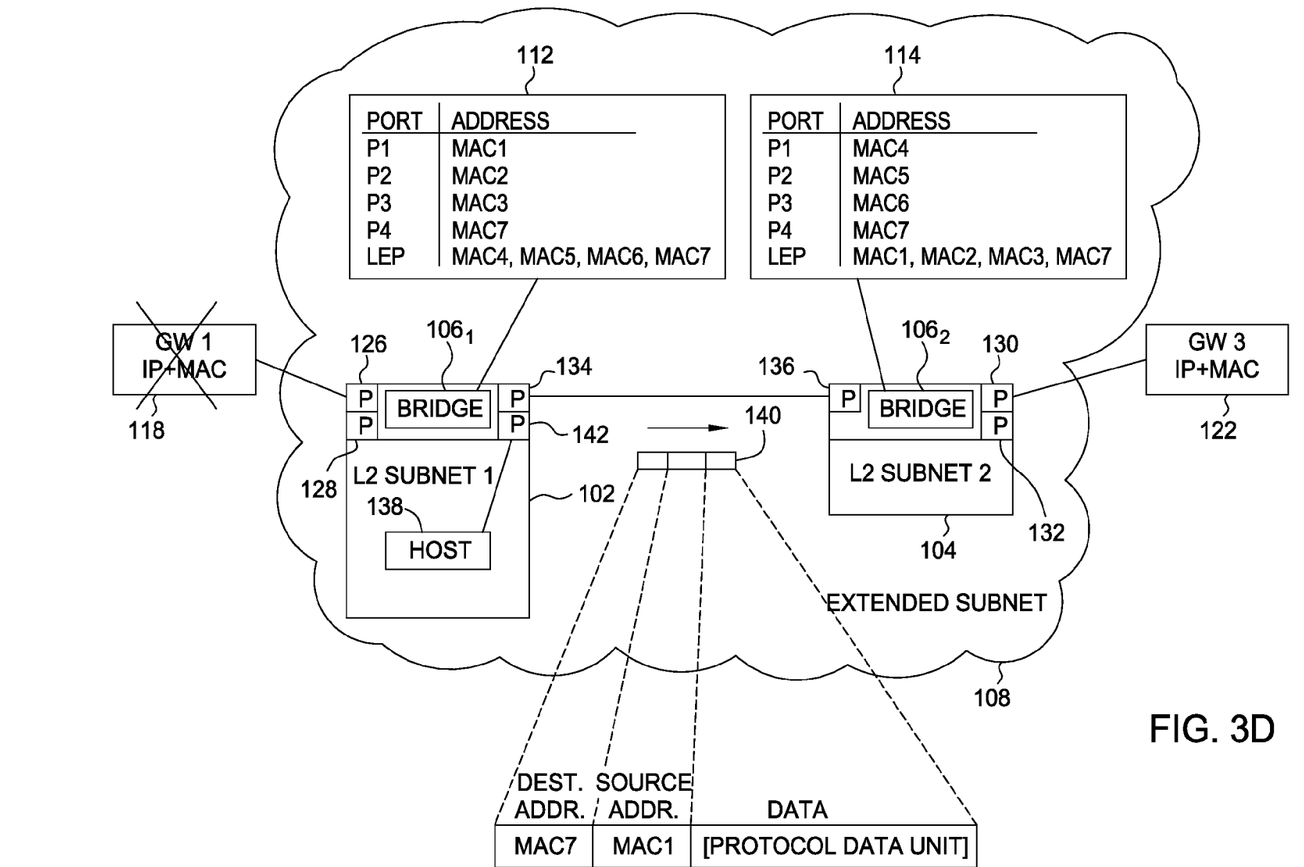
Figure 3E:
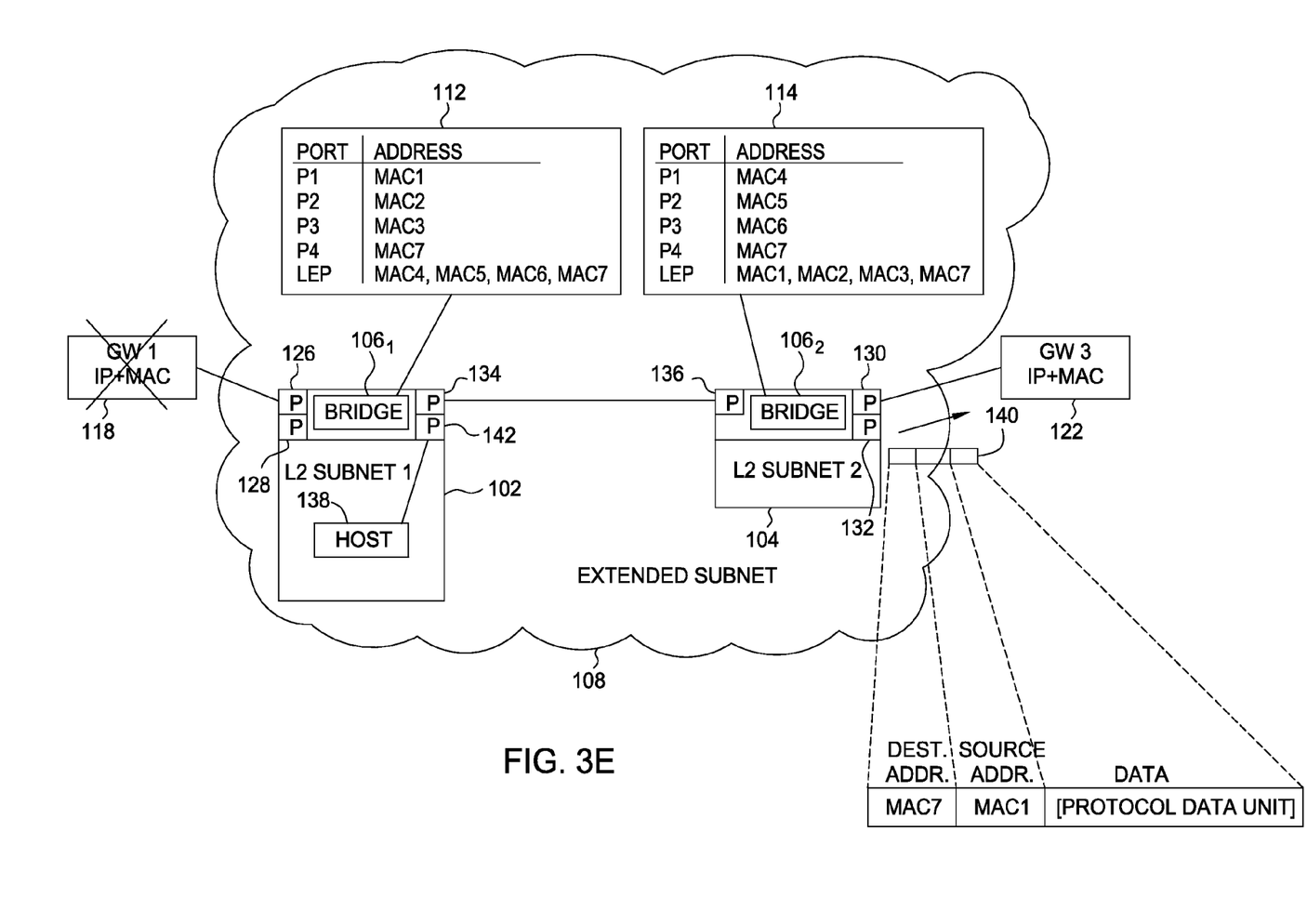

FIGS. 3D and 3E illustrate this result. First, FIG. 3D frame 140 being forwarded over LAN extension port 134 connecting the first L2 subnet 102 and the second L2 subnet 104. In one embodiment, bridge $106_1$ selects to forwards frame 140 over the LAN extension port 134 in response to determining that MAC7 is unreachable over port 126. Thus, should the gateway 1 118 go down, bridge $106_1$ may forward traffic originating in the first L2 subnet 102 having a destination address of the anycast MAC address towards gateway 3 122 in the second L2 subnet 104. Bridge 106₂ receives frame 140 over LAN extension port 136.

In response, bridge 106₂ determines (from MAC address table 114) that the MAC7 destination address is an anycast MAC address reachable over local port "P4" (i.e., port 130). Note, table 114 of bridge 106₂ also shows the anycast MAC address of MAC7 as being reachable over the LAN extension port 134 (i.e., as being reachable in L2 subnet 102). However, sending the frame 140 back towards L2 subnet 102 would result in a loop (as bridge 106₁ made a selective decision to forward frame 140 towards bridge 106₁ over LAN extension port 134). Accordingly, in one embodiment, when a bridge (e.g., bridges 106₁₋₂) receive a frame over a LAN extension port having a destination of the anycast MAC address, the bridge may be configured to not forward the frame back out over the LAN extension port. FIG. 3E shows frame 140 after bridge 106₂ forwards it over port 130 towards gateway 3 122. Once received, gateway 3 122 may forward frame 140 (or the protocol data unit therein) towards an eventual destination.

As described, the method for anycast virtual MAC reachability allows two disjoint L2 domains interconnected by a discrete and configurable number of LAN extension ports to use a common gateway MAC address in multiple subnets. In one embodiment, a tracking element coupled with FHRP may be used to disable the local gateways (i.e., MAC and IP addresses) in case a gateway does not provide appropriate reachability to the IP network (e.g., a gateway goes down). If a gateway is disabled, the MAC entries of the disabled gateway may be removed from the local port. Therefore, traffic destined to the disabled MAC address would be forwarded to the remote site over the LAN extension interface.

Methods for supporting anycast MAC addresses for IP gateway reachability in an extended subnet/LAN environment are presented in this disclosure. The method is based on deterministic topological port roles, as well as signaling across the LAN extension ports. By providing anycast MAC reachability for IP gateways, improved gateway selection, as well as gateway redundancy, is achieved.

While the foregoing is directed to embodiments of the present disclosure, other and further embodiments of the disclosure may be devised without departing from the basic scope thereof, and the scope thereof is determined by the claims that follow.

The invention claimed is:

1. A computer implemented method for providing anycast virtual media access control (MAC) reachability in an extended subnet comprising a first layer 2 subnet and a second layer 2 subnet connected through a first bridge device on the first layer 2 subnet and a second bridge device on the second layer 2 subnet, wherein the first layer 2 subnet includes a first gateway connecting the first layer 2 subnet to a first IP network, and wherein the second layer 2 subnet includes a second gateway connecting the second layer 2 subnet to a second IP network, comprising:
   determining, at the first bridge device, a gateway MAC address associated with both a local port of the first bridge device and a LAN extension port of the first bridge device, wherein the first gateway is reachable within the first layer 2 subnet at the gateway MAC address using the local port, and wherein the second gateway is reachable within the first layer 2 subnet at the gateway MAC address using the LAN extension port;
   receiving, from a host in the first layer 2 subnet, a network frame specifying the gateway MAC address as a destination address; and
   selectively forwarding the received network frame to one of (i) the first gateway using the local port or (ii) the second gateway using the LAN extension port, based at least in part on the destination address.

2. The method of claim 1, wherein the LAN extension port is one of a physical port and a logical port.

3. The method of claim 1, further comprising:
   synchronizing members of a First Hop Resiliency Protocol (FHRP) group to inform all the members of the identified MAC address.

4. The method of claim 1, wherein the first layer 2 subnet and the second layer 2 subnet are disjoint.

5. The method of claim 1, wherein the respective bridge in the first layer 2 subnet and the second layer 2 subnet each includes a set of local ports and the LAN extension port connecting one of the first layer 2 subnet and the second layer 2 subnet to the other layer 2 subnet.

6. The method of claim 1, further comprising:
   determining that the IP network is unreachable over the local gateway in the first layer 2 subnet; and
   removing the MAC address entry programmed for the local gateway in the first layer 2 subnet.

7. The method of claim 1, wherein forwarding the received network frame to one of (i) the first gateway using the local port or (ii) the second gateway using the LAN extension port, further comprises:
   upon determining that the first gateway is available for processing network traffic, forwarding the network frame to the first gateway using the local port, wherein the frame is not replicated to the second gateway using the LAN extension port; and
   upon determining that the first gateway is not currently available for processing network traffic, forwarding the network frame to the second gateway using the LAN extension port.

8. The method of claim 1, wherein forwarding the received network frame to one of (i) the first gateway using the local port or (ii) the second gateway using the LAN extension port, further comprises:
   upon determining that the network frame specifying the gateway MAC address as a destination address was received over the LAN extension port, forwarding the network frame to the first gateway using the local port, wherein the frame is not replicated to the second gateway using the LAN extension port, in order to avoid transmitting the network frame in a loop between the first layer 2 subnet and the second layer 2 subnet.

9. A switch, comprising:
   a processor; and
   a memory containing a program which, when executed on the processor performs an operation for providing anycast virtual media access control (MAC) reachability in an extended subnet comprising a first layer 2 subnet and a second layer 2 subnet connected through a first bridge device on the first layer 2 subnet and a second bridge device on the second layer 2 subnet, wherein the first layer 2 subnet includes a first gateway connecting the first layer 2 subnet to a first IP network, and wherein the second layer 2 subnet includes a second gateway connecting the second layer 2 subnet to a second IP network, the operation comprising:
      determining, at the first bridge device, a gateway MAC address associated with both a local port of the first bridge device and a LAN extension port of the first bridge device, wherein the first gateway is reachable within the first layer 2 subnet at the gateway MAC address using the local port, and wherein the second gateway is reachable within the first layer 2 subnet at the gateway MAC address using the LAN extension port;

receiving, from a host in the first layer 2 subnet, a network frame specifying the gateway MAC address as a destination address; and selectively forwarding the received network frame to one of (i) the first gateway using the local port or (ii) the second gateway using the LAN extension port, based at least in part on the destination address.

10. The switching device of claim 9, wherein the LAN extension port is one of a physical port and a logical port.

11. The switching device of claim 9, wherein the operation further comprises:

synchronizing members of a First Hop Resiliency Protocol (FHRP) group to inform all the members of the identified MAC address.

12. The switching device of claim 9, wherein the first layer 2 subnet and the second layer 2 subnet are disjoint.

13. The switching device of claim 9, wherein the switching device includes a set of local ports and the LAN extension port connecting the first layer 2 subnet to the second layer 2 subnet.

14. The switching device of claim 9, wherein the operation further comprises:

determining that the IP network is unreachable over the local gateway in the first layer 2 subnet; and removing the MAC address entry programmed for the local port for the local gateway in the first layer 2 subnet.

15. A non-transitory computer-readable medium, containing a program, which, when executed on a processor performs an operation for providing anycast virtual media access control (MAC) reachability in an extended subnet comprising a first layer 2 subnet and a second layer 2 subnet connected through a first bridge device on the first layer 2 subnet and a second bridge on the second layer 2 subnet, wherein the first layer 2 subnet includes a first gateway connecting the first layer 2 subnet to a first IP network, and wherein the second layer 2 subnet includes a second gateway connecting the second layer 2 subnet to a second IP network, the operation comprising:

determining, at the first bridge device, a gateway MAC address associated with both a local port of the first bridge device and a LAN extension port of the first bridge device, wherein the first gateway is reachable within the first layer 2 subnet at the gateway MAC address using the local port, and wherein the second gateway is reachable within the first layer 2 subnet at the gateway MAC address using the LAN extension port;

receiving, from a host in the first layer 2 subnet, a network frame specifying having the gateway MAC address as a destination address; and selectively forwarding the received network frame to one of (i) the first gateway using the local port or (ii) the second gateway using the LAN extension port, based at least in part on the destination address.

16. The non-transitory computer-readable medium of claim 15, further operable to:

determine that the IP network is unreachable over the local gateway in the first layer 2 subnet; and remove the MAC address entry programmed on a local port of the local gateway in the first layer 2 subnet.

* * * * *

UNITED STATES PATENT AND TRADEMARK OFFICE
CERTIFICATE OF CORRECTION

PATENT NO.         : 8,848,508 B2                          Page 1 of 1
APPLICATION NO.    : 12/619425
DATED              : September 30, 2014
INVENTOR(S)        : Moreno et al.

It is certified that error appears in the above-identified patent and that said Letters Patent is hereby corrected as shown below:

In the Claims:

Column 10, Claim 15, Line 19, please delete "having".

Signed and Sealed this
Tenth Day of February, 2015

Michelle K. Lee
*Deputy Director of the United States Patent and Trademark Office*